(12) United States Patent
Furukawa

(10) Patent No.: US 8,791,601 B2
(45) Date of Patent: Jul. 29, 2014

(54) WIRELESS POWER RECEIVING APPARATUS AND WIRELESS POWER SUPPLY SYSTEM

(75) Inventor: Yasuo Furukawa, Tokyo (JP)

(73) Assignee: Advantest Corporation, Tokyo (JP)

( * ) Notice: Subject to any disclaimer, the term of this patent is extended or adjusted under 35 U.S.C. 154(b) by 507 days.

(21) Appl. No.: 13/070,674

(22) Filed: Mar. 24, 2011

(65) Prior Publication Data

US 2011/0241436 A1    Oct. 6, 2011

Related U.S. Application Data

(60) Provisional application No. 61/320,548, filed on Apr. 2, 2010.

(51) Int. Cl.
*H01F 27/42* (2006.01)
*H01F 37/00* (2006.01)
*H01F 38/00* (2006.01)

(52) U.S. Cl.
USPC .......................................................... 307/104

(58) Field of Classification Search
None
See application file for complete search history.

(56) References Cited

U.S. PATENT DOCUMENTS

| 5,898,579 | A | 4/1999 | Boys | |
| 7,221,977 | B1 * | 5/2007 | Weaver et al. | 607/29 |
| 2002/0044468 | A1 * | 4/2002 | Goodarzi et al. | 363/98 |
| 2005/0231036 | A1 | 10/2005 | No et al. | |
| 2006/0082324 | A1 | 4/2006 | Boys et al. | |
| 2011/0221277 | A1 * | 9/2011 | Boys | 307/104 |
| 2011/0254379 | A1 * | 10/2011 | Madawala | 307/104 |

FOREIGN PATENT DOCUMENTS

| CN | 1650538 A | 8/2005 |
| JP | 61-185070 | 8/1986 |
| JP | 3-139168 | 6/1991 |
| JP | 7-227003 | 8/1995 |
| JP | 2001-297862 | 10/2001 |
| JP | 2007-060829 | 3/2007 |
| WO | 01/18936 | 3/2001 |
| WO | 2010030195 | 3/2010 |

OTHER PUBLICATIONS

A. Karalis, J.D. Joannopoulos, M. Soljacic, "Efficient wireless non-radiative mid-range energy transfer" Annals of Physics vol. 323, Jan. 2008, pp. 34-48.
IPRP for related PCT/JP2011/005117 issued on Mar. 19, 2013 and its English translation issued on Apr. 9, 2013.
IPRP for the related PCT Application No. PCT/JP2011/001967 issued on Oct. 2, 2012.

(Continued)

*Primary Examiner* — Jared Fureman
*Assistant Examiner* — Aqeel Bukhari
(74) *Attorney, Agent, or Firm* — Ladas & Parry, LLP

(57) ABSTRACT

A wireless power receiving apparatus receives an electric power signal including any one of an electric, magnetic, or electromagnetic field transmitted from a wireless power supply apparatus. A reception coil is configured to receive the electric power signal. A power storage capacitor is arranged having a first terminal set to a fixed electric potential. First and second switches are connected in series to form a closed loop including the reception coil. A connection node that connects these switches is connected to a second terminal of the power storage capacitor. Third and fourth switches are sequentially arranged in series to form a path arranged in parallel with a path comprising the first and second switches. A connection node that connects these switches is set to a fixed electric potential.

8 Claims, 9 Drawing Sheets

(56) References Cited

OTHER PUBLICATIONS

ISR with WO of ISA for related PCT Application No. PCT/JP2011/005117 with English translation.

International Search Report and Written Opinion issued on Sep. 7, 2011 for corresponding PCT Patent Application No. PCT/JP2011/001967.

Office Action dated Dec. 12, 2013 for the related Taiwanese Patent Application No. 100133454 and its English summary provided by the clients.

Office Action dated Jan. 2, 2014 for the corresponding Chinese Patent Application No. 201180017327.4 and its English translation.

Wang, Chwei-Sen, et al. "Design Consideration for a Contactless Electric Vehicle Battery Charger" IEEE Transactions on Industrial Electronics, vol. 52, No. 5, Oct. 2005.

* cited by examiner

100

WIRELESS POWER RECEIVING APPARATUS AND WIRELESS POWER SUPPLY SYSTEM

CROSS-REFERENCE TO RELATED APPLICATIONS

This application claims priority to U.S. Provisional Patent Application No. 61/320,548 filed on Apr. 2, 2010 the disclosure of which is incorporated herein by reference.

BACKGROUND OF THE INVENTION

1. Field of the Invention

The present invention relates to a wireless power supply technique.

2. Description of the Related Art

In recent years, wireless (contactless) power transmission has been receiving attention as a power supply technique for electronic devices such as cellular phone terminals, laptop computers, etc., or for electronic vehicles. Wireless power supply transmission can be classified into three principal methods using an electromagnetic induction, an electromagnetic wave reception, and an electric field/magnetic field resonance.

The electromagnetic induction method is employed to supply electric power at a short range (several cm or less), which enables electric power of several hundred watts to be transmitted in a band that is equal to or lower than several hundred kHz. The power use efficiency thereof is on the order of 60% to 98%.

In a case in which electric power is to be supplied over a relatively long range of several meters or more, the electromagnetic wave reception method is employed. The electromagnetic wave reception method allows electric power of several watts or less to be transmitted in a band between medium waves and microwaves. However, the power use efficiency thereof is small. The electric field/magnetic field resonance method has been receiving attention as a method for supplying electric power with relatively high efficiency at a middle range on the order of several meters (see Non-patent document 1).

RELATED ART DOCUMENTS

Patent Documents

[Non-Patent Document 1]
A. Karalis, J. D. Joannopoulos, M. Soljacic, "Efficient wireless non-radiative mid-range energy transfer" ANNALS of PHYSICS Vol. 323, January 2008, pp. 34-48.

With electric power transmission by means of magnetic field coupling, the electromagnetic induction inter-coil coupling coefficient k is reduced according to the cube of the distance. This is because the distance between coils is restricted and cannot be increased. With conventional techniques, a typical arrangement employs coils arranged in the vicinity of each other in order to realize a state in which the coupling coefficient is approximately 1.

SUMMARY OF THE INVENTION

The present inventor has directed attention to the fact that the wireless resonance electric power supply technique provides high transmission efficiency between coils in a resonant state as long as the Q value is high even if the coupling coefficient is low (transmission efficiency $\propto k \cdot Q$) That is to say, by raising the Q value, such an arrangement has a potential to provide high-efficiency transmission even if the distance between the primary coil and the secondary coil is great, i.e., the coupling efficiency therebetween is extremely low (0.01 or less).

For example, in a case in which k=0.01 or less, the Q value must be set to 100 or more. However, it is difficult for ordinary coils to provide such a high Q value due to the wiring resistance and the skin effect. In particular, it is difficult for a small-size coil to provide such a high Q value.

It should be noted that the above-described consideration is by no means within the scope of common and general knowledge in the field of the present invention. Furthermore, it can be said that the present inventor has been the first to arrive at this consideration.

The present invention has been made in order to solve such a problem. Accordingly, it is an exemplary purpose of the present invention to provide a power reception circuit which is capable of providing a high Q value.

An embodiment of the present invention relates to a wireless power receiving apparatus configured to receive an electric power signal including any one of an electric field, a magnetic field, and an electromagnetic field, transmitted from a wireless power supply apparatus. The wireless power receiving apparatus comprises: a reception coil configured to receive the electric power signal; a capacitor arranged such that a first terminal thereof is set to a fixed electric potential; a first switch and a second switch sequentially connected in series so as to form a closed loop together with the reception coil, and arranged such that a connection node that connects the first and second switches is connected to a second terminal of the capacitor; a third switch and a fourth switch sequentially arranged in series so as to form a path arranged in parallel with a path comprising the first and second switches, and arranged such that a connection node that connects the third and fourth switches is set to a fixed electric potential; and a control unit configured to control the first switch through the fourth switch.

With such an embodiment, by appropriately controlling the first through fourth switches, such an arrangement is capable of raising the Q value of the circuit. Thus, such an arrangement provides high-efficiency power transmission even if the coupling efficiency is low between the wireless power supply apparatus and the wireless power receiving apparatus.

Also, the control unit may be configured to be capable of switching states between a first state in which the first switch and the fourth switch are on and the second switch and the third switch are off, and a second state in which the first switch and the fourth switch are off and the second switch and the third switch are on.

Also, the control unit may control a switching timing at which the state is switched between the first state and the second state such that the amplitude of a current that flows through the reception coil approaches a maximum value.

Also, the first and second switches may be arranged to form a closed loop together with an auxiliary coil densely coupled with the reception coil, instead of with the reception coil.

Another embodiment of the present invention relates to a wireless power supply system. The wireless power supply system comprises: a wireless power supply apparatus configured to transmit an electric power signal including any one of an electric field, a magnetic field, and an electromagnetic field; and the aforementioned wireless power receiving apparatus.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 1:
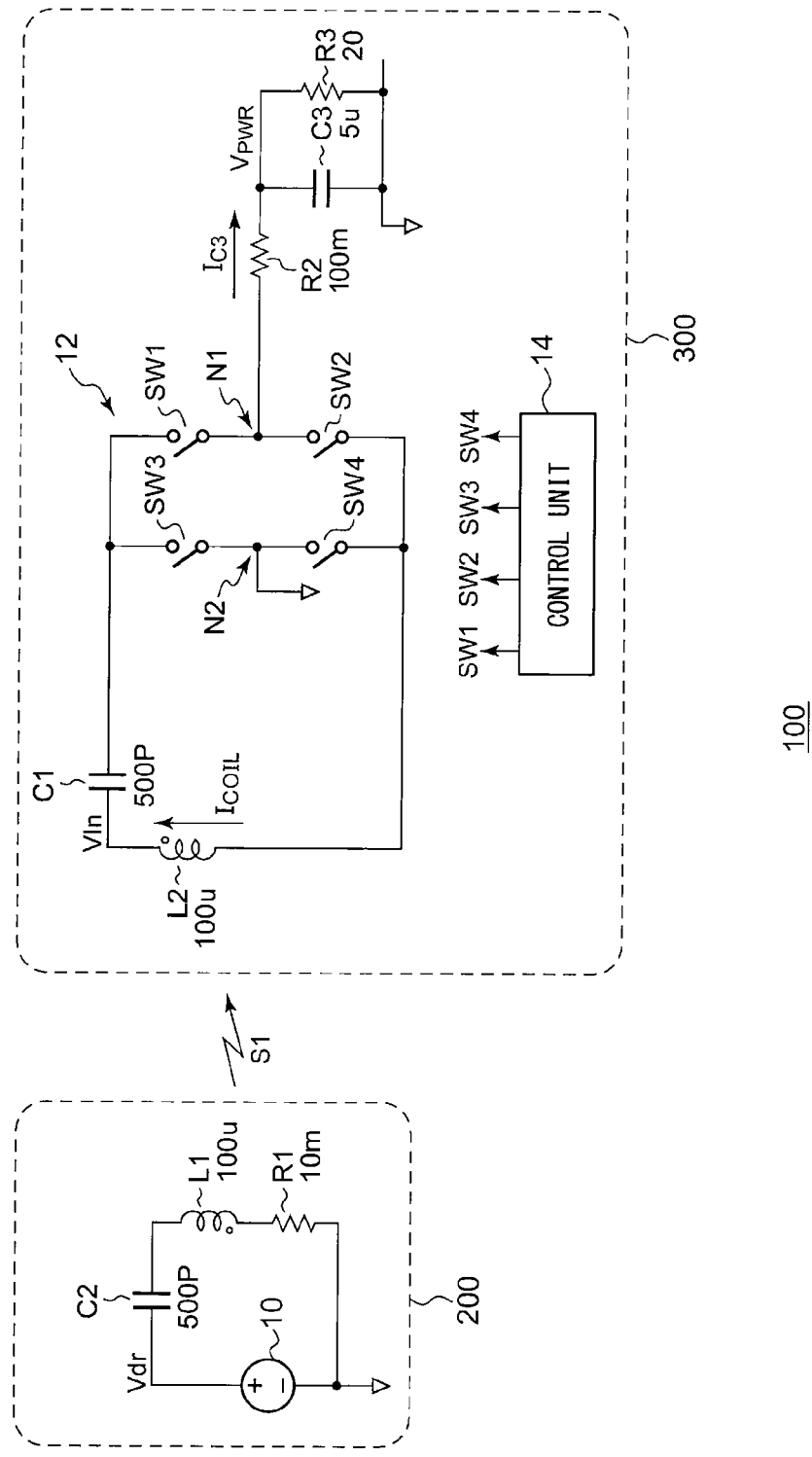
FIG. 1 is a circuit diagram which shows a configuration of a wireless power supply system according to an embodiment.

FIG. 1 is a circuit diagram which shows a configuration of a wireless power supply system 100 according to an embodiment. In this circuit diagram, circuit constants are shown for exemplary purposes. However, such circuit constants are not intended to limit the present invention. The wireless power supply system 100 includes a wireless power supply apparatus 200 and a wireless power receiving apparatus 300. First, description will be made regarding the configuration of the wireless power supply apparatus 200.

The wireless power supply apparatus 200 transmits an electric power signal to the wireless power receiving apparatus 300. As an electric power signal S1, the wireless power supply system 100 uses the near-field component (electric field, magnetic field, or electromagnetic field) of electromagnetic waves that has not become radio waves.

The wireless power supply apparatus 200 includes an AC power supply 10, a transmission coil L1, and a capacitor C2. The AC power supply 10 generates an electric signal S2 having a predetermined frequency, or subjected to frequency-modulation, phase-modulation, amplitude-modulation, or the like. For simplicity of description and ease of understanding, description will be made in the present embodiment regarding an arrangement in which the electric signal S2 is an AC signal having a constant frequency. For example, the frequency of the electric signal S2 is selected from a range between several hundred KHz and several MHz.

The transmission coil L1 is an antenna configured to emit the electric signal S2 generated by the AC power supply 10, as a near-field signal (electric power signal) including any one of an electric field, magnetic field, or electromagnetic field. The transmission capacitor C2 is arranged in series with the transmission coil L1. The resistor R1 represents the resistance component that is in series with the transmission coil L1.

The above is the configuration of the wireless power supply apparatus 200. Next, description will be made regarding the configuration of the wireless power receiving apparatus 300.

The wireless power receiving apparatus 300 receives the electric power signal S1 transmitted from the wireless power supply apparatus 200.

The reception coil 20 receives the electric power signal S1 from the transmission coil L1. An induced current (resonant current) $I_{COIL}$ that corresponds to the electric power signal S1 flows through the reception coil L2. The wireless power receiving apparatus 300 acquires electric power via the induced current thus generated.

The wireless power receiving apparatus 300 includes a reception coil L2, a resonance capacitor C1, an H-bridge circuit 12, a control unit 14 and a power storage capacitor C3. Together with the reception coil L2, the resonance capacitor C1 forms a resonance circuit.

A first terminal of the power storage capacitor C3 is grounded, and the electric potential thereof is fixed. The H-bridge circuit 12 includes a first switch SW1 through a fourth switch SW4. The first switch SW1 and the second switch SW2 are sequentially connected in series so as to form a closed loop including the reception coil L2 and the resonance capacitor C1. A connection node N1 that connects the first switch SW1 and the second switch SW2 is connected to a second terminal of the power storage capacitor C3. A loss resistance R2 represents power loss that occurs in the wireless power receiving apparatus 300. A load resistor R3 represents a load driven by the electric power stored in the power storage capacitor C3, and does not represents a resistor arranged as a circuit component. A voltage $V_{PWR}$ that develops at the power storage capacitor C3 is supplied to the load resistance R3.

The third switch SW3 and the fourth switch SW4 are sequentially arranged in series so as to form a path that is parallel to a path that includes the first switch SW1 and the second switch SW2. A connection node N2 that connects the third switch SW3 and the fourth switch SW4 is grounded, and has a fixed electric potential. The load resistor R3 may be controlled such that the voltage $V_{PWR}$ that develops at the power storage capacitor C3 becomes the optimum value for increasing the Q value.

The first switch SW1 through the fourth switch SW4 are each configured as a MOSFET (Metal Oxide Semiconductor Field Effect Transistor), a bipolar transistor, or an IGBT (Insulated Gate Bipolar Transistor), or the like.

A control unit 14 controls the first switch SW1 through the fourth switch SW4.

Specifically, the control unit 14 is configured to be capable of switching the state between a first state $\phi 1$ and a second state $\phi 2$. In the first state $\phi 1$, the first switch SW1 and the fourth switch SW4 are on, and the second switch SW2 and the third switch SW3 are off. In the second state $\phi 2$, the first switch SW1 and the fourth switch SW4 are off, and the second switch SW2 and the third switch SW3 are on.

The induced current $I_{COIL}$ that develops at the reception coil L2 has an AC waveform. The control unit 14 adjusts a switching timing (phase) at which the state is switched between the first state $\phi 1$ and the second state $\phi 2$, such that the amplitude of the induced current $I_{COIL}$ approaches the maximum value.

Figure 2A:
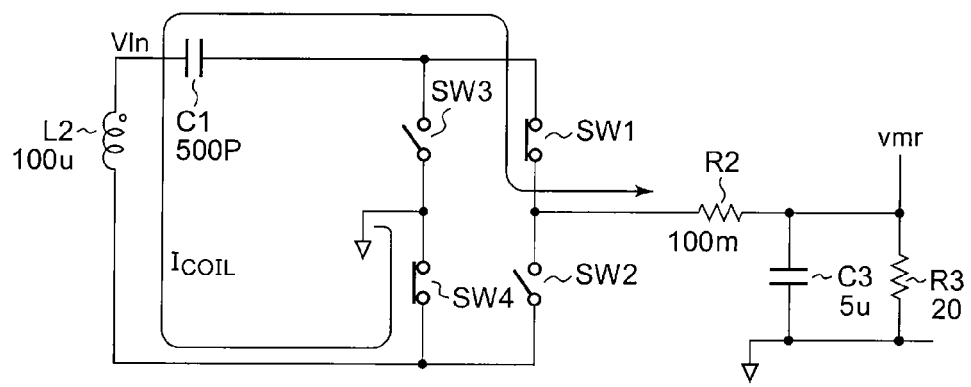
FIGS. 2A and 2B are circuit diagrams each showing the operation of the wireless power receiving apparatus shown in FIG. 1.
Figure 2B:
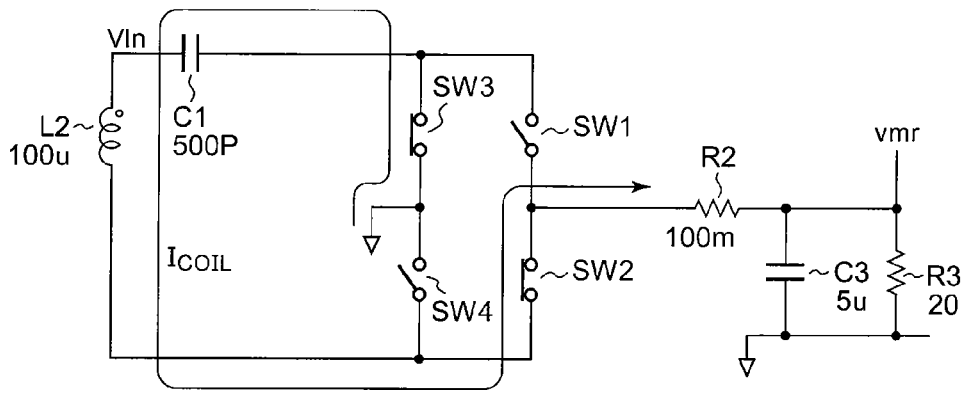
Figure 3:
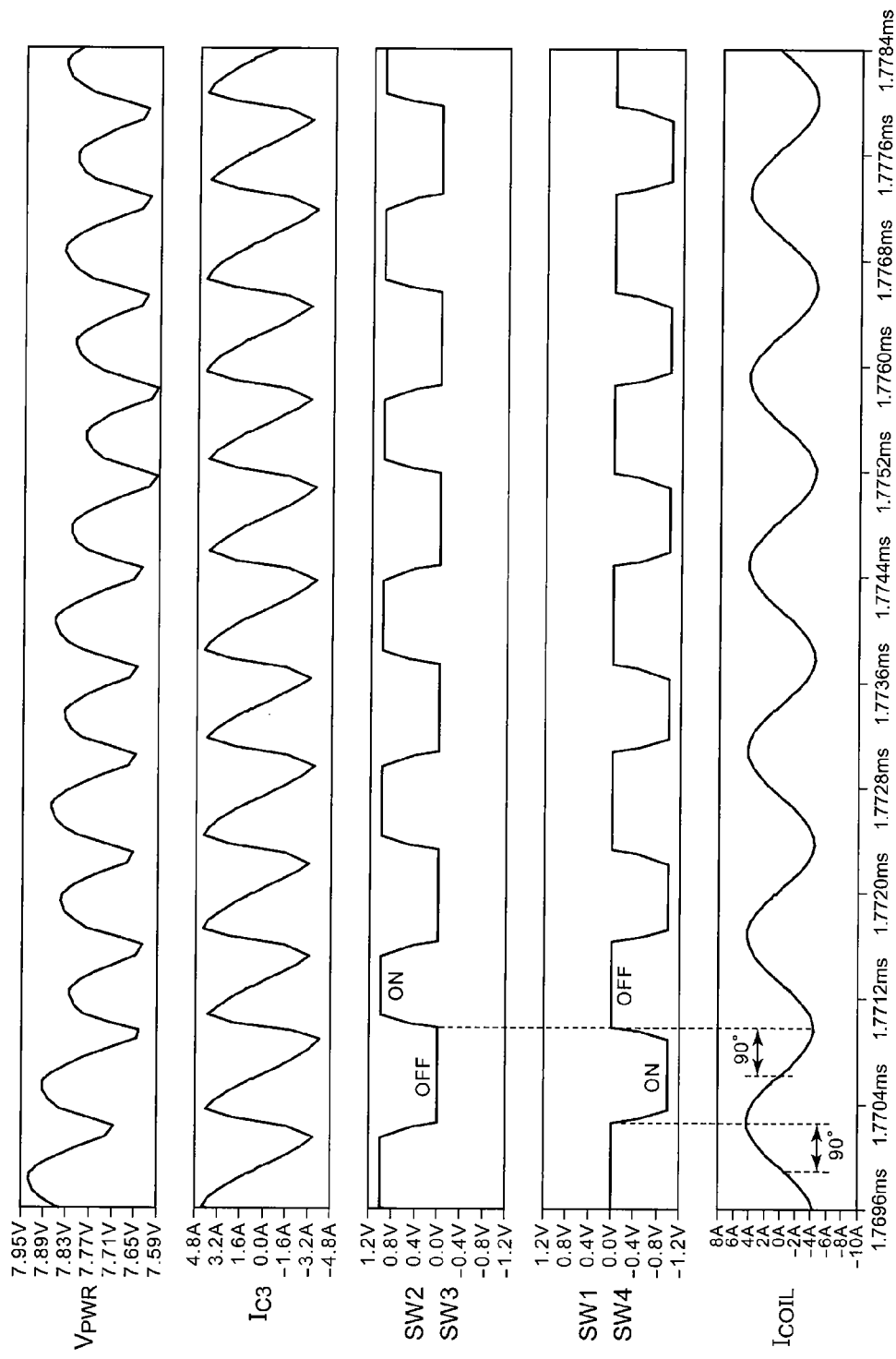
FIG. 3 is a waveform diagram which shows the operation of the wireless power receiving apparatus shown in FIG. 1.

The above is the configuration of the wireless power supply system 100. Next, description will be made regarding the operation thereof. FIGS. 2A and 2B are circuit diagrams each showing the operation of the wireless power receiving apparatus 300 shown in FIG. 1. FIG. 2A shows the state of each switch and the current in the first state $\phi 1$, and FIG. 2B shows the state of each switch and the current in the second state $\phi 2$. FIG. 3 is a waveform diagram which shows the operation of the wireless power receiving apparatus 300 shown in FIG. 1. From the top and in the following order, FIG. 3 shows the voltage $V_{PWR}$ that develops at the power storage capacitor C3, a current $I_{C3}$ that flows into the power storage capacitor C3, the states of the second switch SW2 and the third switch SW3, the states of the first switch SW1 and the fourth switch SW4, and the induced current $I_{COIL}$ that develops at the reception coil L2.

In FIG. 3, the states of the second switch SW2 and the third switch SW3 each correspond to the fully-on state when the voltage is +1 V, and correspond to the off state when the voltage is 0 V. On the other hand, the states of the first switch SW1 and the fourth switch SW4 each correspond to the fully-on state when the voltage is −1 V, and correspond to the off state when the voltage is 0 V. The voltage level which indicates the state of each switch is determined for convenience. The waveform is shown with the direction of the arrow shown in FIG. 1 as the positive direction.

First, the AC electric power signal S1 is transmitted from the wireless power supply apparatus 200 shown in FIG. 1. The induced current $I_{COIL}$, which is an AC current, flows through the reception coil L2 according to the electric power signal S1.

The control unit 14 controls the on/off state of each of the first switch SW1 through the fourth switch SW4 in synchronization with the electric power signal S1. In the first state $\phi 1$, the current $I_{C3}$ flows from the ground terminal via the fourth switch SW4, the reception coil L2, the resonance capacitor C1, and the first switch SW1, as shown in FIG. 2A. In the second state $\phi 2$, the current $I_{C3}$ flows from the ground terminal via the third switch SW3, the reception coil L2, the resonance capacitor C1, and the second switch SW2, as shown in FIG. 2B. The control unit 14 may monitor the induced current $I_{COIL}$ or the electric power supplied to the load resistor R3, and may optimize the switching timing (phase) at which the H-bridge circuit 12 is switched such that the amplitude thereof approaches the maximum value.

In a case in which the power storage capacitor C3 has a sufficient capacitance to function as a voltage source, such a power storage capacitor C3 can be used as a driving voltage source for the resonance circuit. Thus, by coupling the power storage capacitor C3 with the reception coil L2 at a phase shifted by 90 degrees with respect to the zero-crossing point of the induced current (resonance current) $I_{COIL}$, such an arrangement is capable of compensating for the loss due to the resistance component of the reception coil L2 and so forth by means of the power storage capacitor C3 functioning as a power supply.

The Q value of the resonance circuit is inversely proportional to the resistance R. However, if the power storage capacitor C3 can perfectly compensate for the power loss due to the resistance R, the resistance R can be regarded as zero, thereby providing a circuit equivalent to a resonance circuit having an infinite Q value.

As described above, with the wireless power receiving apparatus 300 according to the embodiment, by optimizing the switching timing (phase) at which the state of the H-bridge circuit 12 is switched between the first state $\phi 1$ and the second state $\phi 2$, such an arrangement is capable of applying the voltage that develops at the power storage capacitor C3 to the reception coil L2 at a suitable timing, thereby immensely improving the effective Q value.

Figure 7:
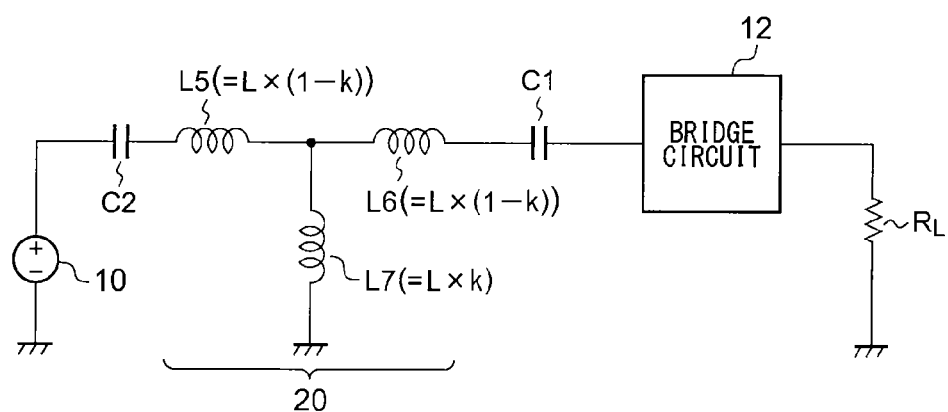
FIG. 7 is an equivalent circuit diagram which shows a wireless power supply system shown in FIG. 1.

FIG. 7 is an equivalent circuit diagram showing the wireless power supply system 100 shown in FIG. 1. In the wireless power supply system 100 shown in FIG. 1, the transmission coil L1 and the reception coil L2, which are coupled with a coupling coefficient k, can be regarded as a T-shaped circuit 20 including inductors L5 through L7. When L1=L2=L, the inductances of the inductors L5 and L6 are each represented by L×(1−k), and the inductance of L6 is represented by L×k.

Optimization of the switching timing at which the H-bridge circuit 12 is switched between the first state $\phi 1$ and the second state $\phi 2$ is equivalent to optimization of impedance matching between the AC power supply 10 and the load resistor R3. That is to say, the H-bridge circuit 12 can be regarded as a switch-mode impedance matching circuit. If the output impedance of the AC power supply 10 or the coupling coefficient k changes, the impedance matching conditions also change. The phase of the switching operation of the H-bridge circuit 12 is controlled so as to provide optimum impedance matching.

With conventional arrangements, the resonance capacitor C1 or C2 is configured as a variable capacitor, and this variable capacitor is mechanically controlled by means of a motor so as to provide such impedance matching. In contrast, with the present embodiment, by controlling the switching state of the H-bridge circuit 12, such an arrangement provides the impedance matching electrically instead of mechanically.

With impedance matching by mechanical means, a high-speed control operation cannot be performed. This leads to a problem in that, in a case in which the wireless power receiving apparatus 300 moves, such an arrangement cannot maintain the impedance matching, leading to deterioration in the power supply efficiency. In contrast, the present embodiment provides high-speed impedance matching as compared to such a conventional arrangement. The present arrangement provides a highly efficient power supply even if the wireless power receiving apparatus 300 moves, or even if the power supply state of the wireless power supply apparatus 200 is switched at a high speed.

The wireless power receiving apparatus 300 having a high Q value provides high-efficiency electric power transmission even if the coupling coefficient k between the transmission coil L1 and the reception coil L2 is low, i.e., even if there is a great distance between the wireless power receiving apparatus 300 and the wireless power supply apparatus 200.

It should be noted that the switching timing of each of the first switch SW1 through the fourth switch SW4 is not restricted to such an arrangement described with reference to FIG. 3. By controlling the on/off switching timing, such an arrangement is capable of controlling the Q value of the resonance circuit. In a case of intentionally providing a low Q value, such an arrangement may intentionally shift the on/off switching timing from that shown in FIG. 3.

Furthermore, with such a configuration shown in FIG. 1, the H-bridge circuit 12 configured to raise the Q value also functions as a rectifier circuit. Thus, such an arrangement has another advantage in that there is no need to provide a rectifier circuit including a diode or the like as an additional circuit, unlike a modification described later.

Figure 4:
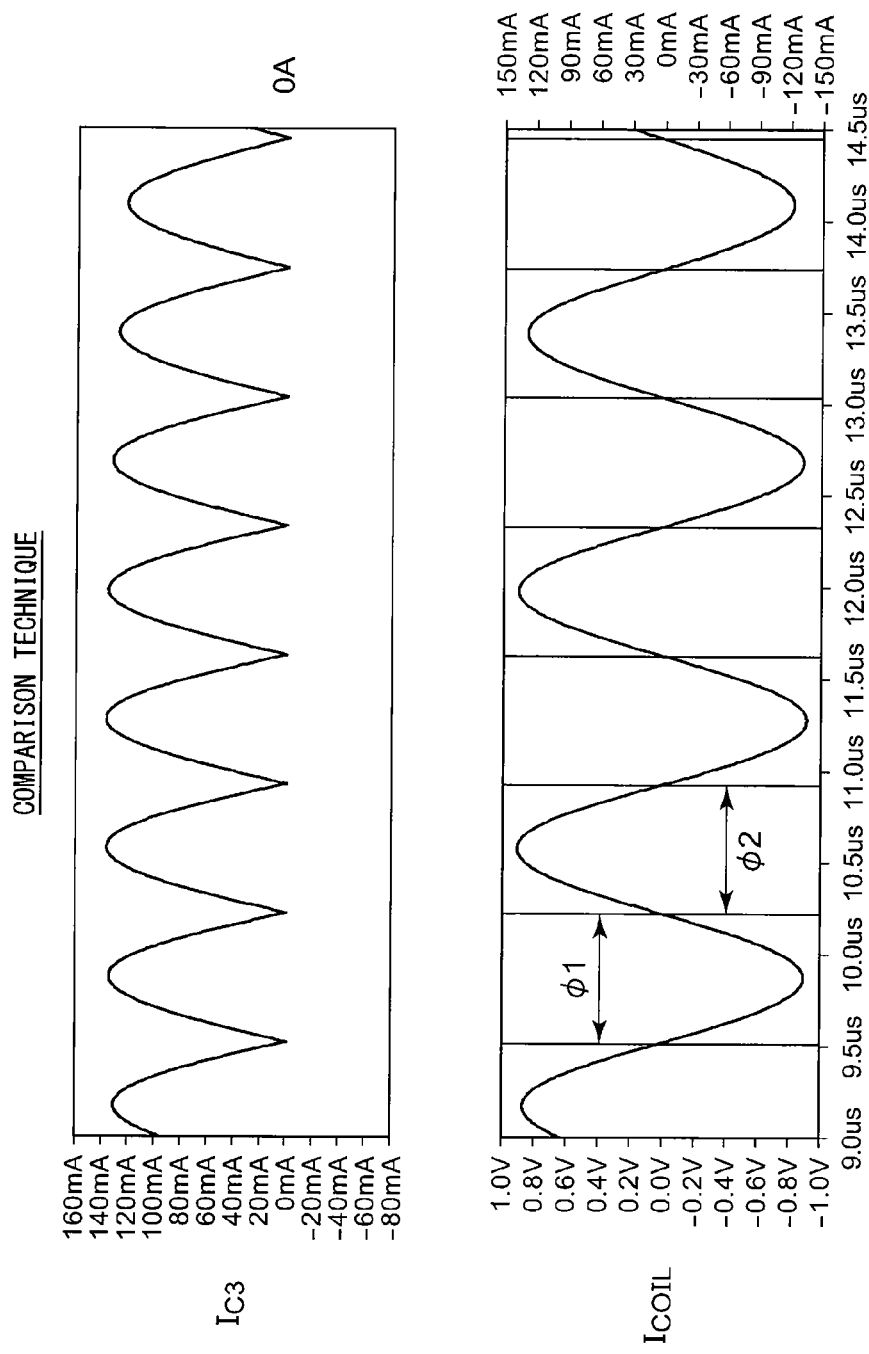
FIG. 4 is a waveform diagram which shows the operation of a synchronous rectifier circuit as a comparison technique.

It should be noted that the aforementioned H-bridge circuit 12 must not be identified as a typical synchronous rectifier circuit. FIG. 4 is a waveform diagram which shows the operation of a synchronous rectifier circuit as a comparison technique. With such a synchronous rectifier circuit, the state is switched between the first state φ1 and the second state φ2 when a zero-crossing point occurs in the resonance current $I_{COIL}$. In this case, the current $I_{C3}$ that flows into the power storage capacitor C3 has a waveform that has been subjected to full-wave rectification. It should be noted that, unlike rectification by means of a diode, voltage loss does not occur in this rectification. Such a synchronous rectifier circuit cannot compensate for the loss that occurs in the resonance circuit. Accordingly, such an arrangement does not provide an improved Q value.

Description has been made regarding the present invention with reference to the embodiments. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Figure 5:
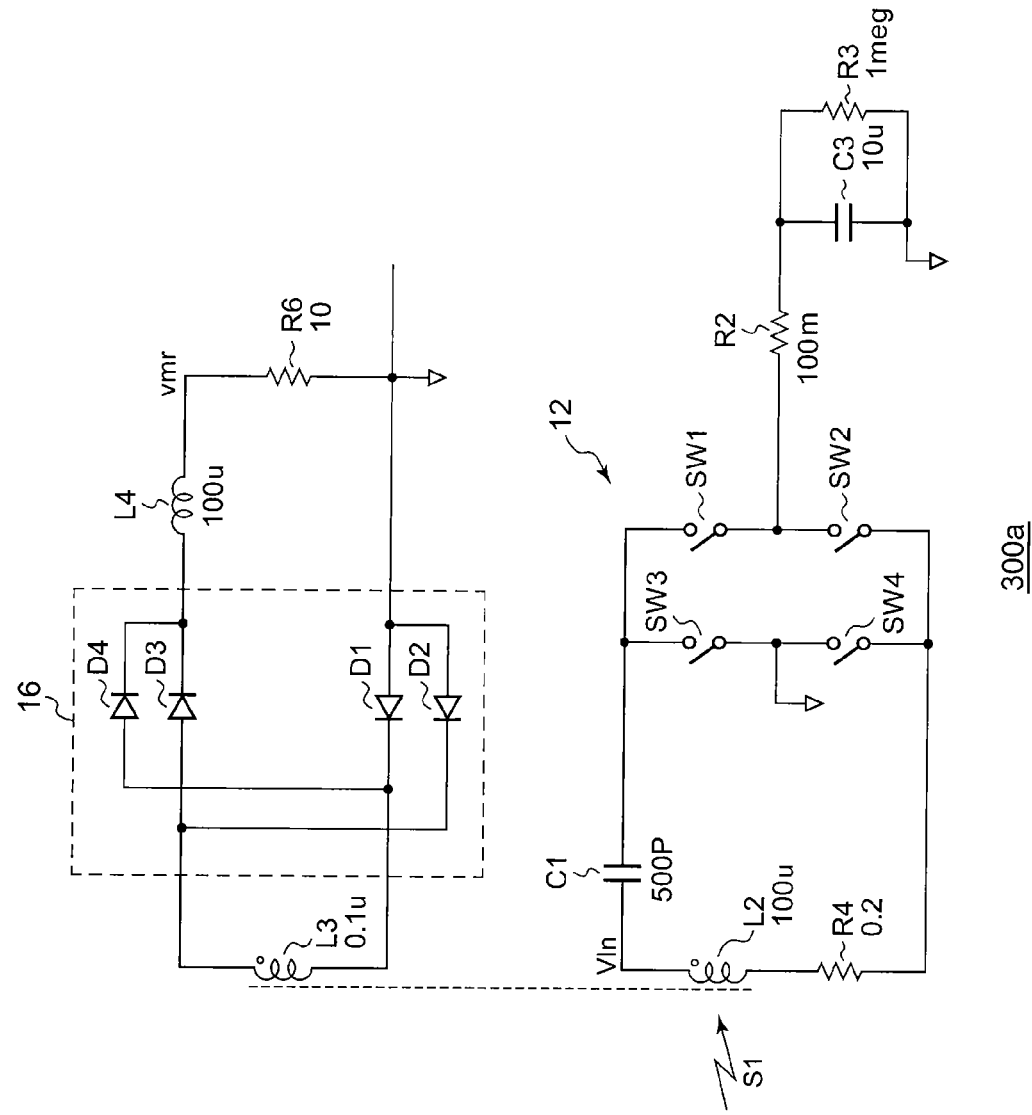
FIG. 5 is a circuit diagram which shows a configuration of a wireless power receiving apparatus according to a first modification.

FIG. 5 is a circuit diagram which shows a configuration of a wireless power receiving apparatus 300a according to a first modification. It should be noted that a part of the circuit components that overlaps those shown in FIG. 1 are not shown. The point of difference between the wireless power receiving apparatus 300a shown in FIG. 5 and the wireless power receiving apparatus 300 shown in FIG. 1 is the position of the load. Specifically, in FIG. 5, the resistor R6 functions as a load, instead of the resistor R3. The resistor R3 arranged in parallel with the power storage capacitor C3 has a negligible effect.

The wireless power receiving apparatus 300a shown in FIG. 5 includes an auxiliary coil L3, a rectifier circuit 16, and an inductor L4, in addition to the wireless power receiving apparatus 300 shown in FIG. 1.

The auxiliary coil L3 is densely coupled with the reception coil L2. The rectifier circuit 16 performs full-wave rectification of a current $I_{L3}$ that flows through the auxiliary coil L3. The inductor L4 is arranged on the output side of the rectifier circuit 16 in series with the load resistor R6.

With such a configuration shown in FIG. 5, the Q value of the resonance circuit comprising the reception coil L2 and the resonance capacitor C1 is raised by the Q value amplifier circuit including the H-bridge circuit 12 and the power storage capacitor C3. As a result, a large amount of current $I_{L3}$ is induced in the auxiliary coil L3 densely coupled with the reception coil L2, thereby providing a large amount of electric power to the load resistor R6.

Figure 6:
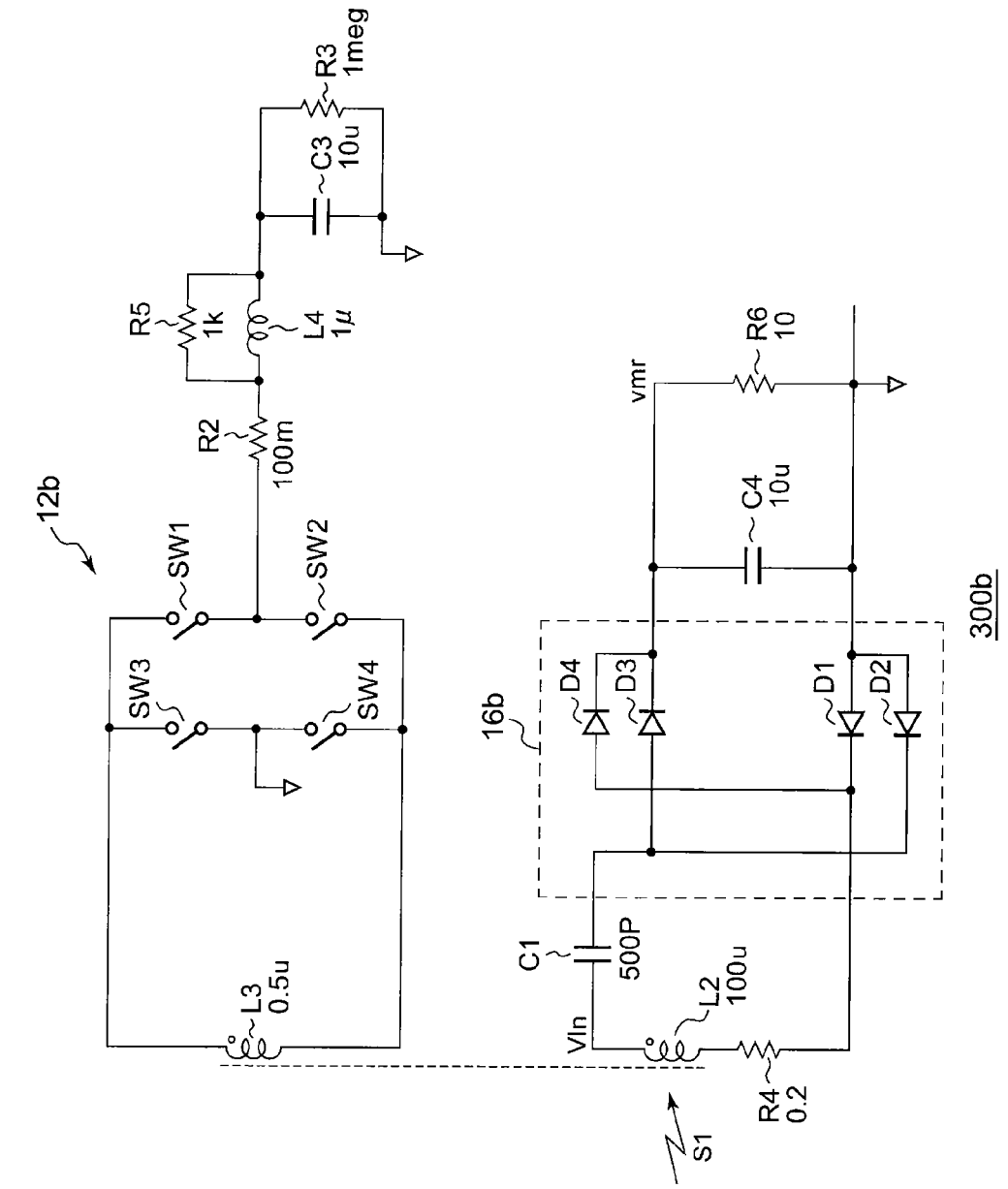
FIG. 6 is a circuit diagram which shows a configuration of a wireless power receiving apparatus according to a second modification.

FIG. 6 is a circuit diagram which shows a configuration of a wireless power receiving apparatus 300b according to a second modification. The wireless power receiving apparatus 300b includes an auxiliary coil L3 densely coupled with the reception coil L2. With such an arrangement, an H-bridge circuit 12b is connected to the auxiliary coil L3, instead of the reception coil L2. An inductor L4 and a resistor R5 connected in parallel are arranged between the H-bridge circuit 12b and the power storage capacitor C3.

The rectifier circuit 16b performs full-wave rectification of the current that flows through the resonance circuit including the reception coil L2 and the resonance capacitor C1. The power storage capacitor C4 is arranged on the output side of the rectifier circuit 16b, and is configured to smooth the current thus subjected to full-wave rectification by the rectifier circuit 16b. The voltage that develops at the power storage capacitor C4 is supplied to the load resistor R6.

With such a configuration shown in FIG. 6, via the auxiliary coil L3, a Q value amplifier circuit comprising the H-bridge circuit 12b and the power storage capacitor C3 is capable of raising the Q value of the resonance circuit that includes the reception coil L2 and the resonance capacitor C1. As a result, such an arrangement is capable of receiving electric power with high efficiency.

Description has been made in the embodiment regarding an arrangement in which the H-bridge circuit 12 can be switched between the first state φ1 and the second state φ2, and in which the phase of switching these states is controlled. In the third modification, the following control operation is performed, instead of or in addition to the phase control.

Figure 8:
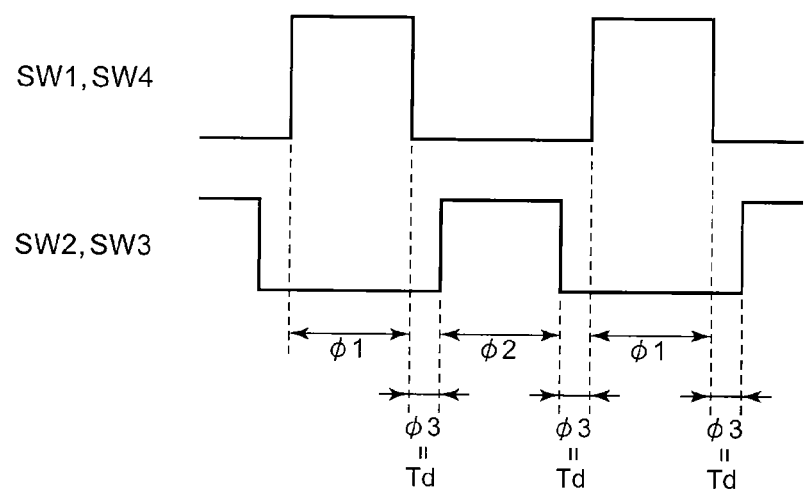
FIG. 8 is a time chart which shows the operation of a wireless power supply system according to a third modification.

In the third modification, the control unit 14 is capable of switching the state to a third state φ3 in which all of the first switch SW1 through the fourth switch SW4 are turned off, in addition to the first state φ1 and the second state φ2. The control unit 14 provides the third state φ3 as an intermediate state in at least one of the transitions from the first state φ1 to the second state φ2 or from the second state φ2 to the first state φ1, so as to adjust the length of the period of time for the third state φ3 (which will also be referred to as the "dead time Td") such that the amplitude of the induced current $I_{COIL}$ that flows through the reception coil L2 approaches the maximum value. FIG. 8 is a time chart which shows the operation of the wireless power supply system 100 according to a third modification.

The resonance frequency of the resonance circuit that comprises the reception coil L2, the resonance capacitor C1, and the H-bridge circuit 12, does not necessarily match the frequency of the electric power signal S1 generated by the wireless power supply apparatus 200. In this case, by adjusting the length of the dead time Td, such an arrangement allows the induced current $I_{COIL}$ that flows in the first state φ1 and in the second state φ2 to partially resonate with the resonance circuit included in the wireless power receiving apparatus 300. That is to say, such an arrangement is capable of tuning the resonance frequency of the wireless power supply apparatus 200 to the frequency of the electric power signal S1, thereby improving the power supply efficiency.

Description has been made in the embodiment regarding an arrangement in which the H-bridge circuit 12 is employed as a switch-mode impedance matching circuit. Also, a half-bridge circuit may be employed.

Figure 9:
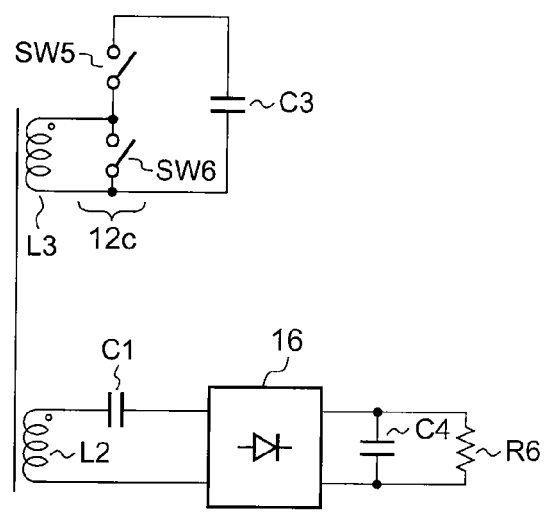
FIG. 9 is a circuit diagram which shows a configuration of a wireless power receiving apparatus according to a fourth modification.

FIG. 9 is a circuit diagram which shows a configuration of a wireless power receiving apparatus 300c according to a fourth modification. The wireless power receiving apparatus 300c shown in FIG. 9 has a configuration obtained by replacing the H-bridge circuit 12b included in the wireless power receiving apparatus 300b shown in FIG. 6 with a half-bridge circuit 12c. The half-bridge circuit 12c includes a fifth switch SW5 and a sixth switch SW6. The fifth switch SW5 is connected to the power storage capacitor C3 and the auxiliary coil L3 so as to form a closed loop. The sixth switch SW6 is arranged between both terminals of the auxiliary coil L3.

With the fourth modification, by controlling the phase of switching on and off the fifth switch SW5 and the sixth switch SW6, such an arrangement is capable of providing impedance matching. Furthermore, by adjusting the length of the dead time during which the fifth switch SW5 and the sixth switch SW6 are off at the same time, such an arrangement is capable of using the partial resonance to improve the transmission efficiency.

Description has been made in the embodiment regarding an arrangement in which the switch-mode impedance matching circuit 12 is provided only on the wireless power receiving apparatus 300 side. Also, a switch-mode impedance matching circuit such as a half-bridge circuit and an H-bridge circuit is preferably also provided on the wireless power supply apparatus 200 side: specifically, to the output stage of the AC power supply 10.

While the preferred embodiments of the present invention have been described using specific terms, such description is for illustrative purposes only, and it is to be understood that changes and variations may be made without departing from the spirit or scope of the appended claims.

What is claimed is:

1. A wireless power receiving apparatus configured to receive an electric power signal including any one of an electric field, a magnetic field, and an electromagnetic field, transmitted from a wireless power supply apparatus, the power receiving apparatus comprising:
    a reception coil configured to receive the electric power signal;
    a capacitor arranged such that a first terminal thereof is set to a fixed electric potential;
    a first switch and a second switch sequentially connected in series so as to form a closed loop together with the reception coil, and arranged such that a connection node that connects the first and second switches is connected to a second terminal of the capacitor;
    a third switch and a fourth switch sequentially arranged in series so as to form a path arranged in parallel with a path comprising the first and second switches, and arranged such that a connection node that connects the third and fourth switches is set to a fixed electric potential; and
    a control unit configured to control the first switch through the fourth switch,
    wherein the control unit is configured to be capable of switching states between a first state in which the first switch and the fourth switch are on and the second switch and the third switch are off, and a second state in which the first switch and the fourth switch are off and the second switch and the third switch are on, and
    wherein the control unit controls a switching timing at which the state is switched between the first state and the second state such that the amplitude of a current that flows through the reception coil approaches a maximum value.

2. A wireless power receiving apparatus configured to receive an electric power signal including any one of an electric field, a magnetic field, and an electromagnetic field, transmitted from a wireless power supply apparatus, the power receiving apparatus comprising:
    a reception coil configured to receive the electric power signal;
    a capacitor arranged such that a first terminal thereof is set to a fixed electric potential;
    a first switch and a second switch sequentially connected in series so as to form a closed loop together with the reception coil, and arranged such that a connection node that connects the first and second switches is connected to a second terminal of the capacitor;
    a third switch and a fourth switch sequentially arranged in series so as to form a path arranged in parallel with a path comprising the first and second switches, and arranged such that a connection node that connects the third and fourth switches is set to a fixed electric potential; and
    a control unit configured to control the first switch through the fourth switch,
    wherein the control unit is configured to be capable of switching states between a first state in which the first switch and the fourth switch are on and the second switch and the third switch are off, and a second state in which the first switch and the fourth switch are off and the second switch and the third switch are on, and
    wherein the length of the third state is controlled such that the amplitude of a current that flows through the reception coil approaches a maximum value.

3. A wireless power receiving apparatus configured to receive an electric power signal including any one of an electric field, a magnetic field, and an electromagnetic field, transmitted from a wireless power supply apparatus, the power receiving apparatus comprising:
    a reception coil configured to receive the electric power signal;
    a capacitor arranged such that a first terminal thereof is set to a fixed electric potential;
    a first switch and a second switch sequentially connected in series so as to form a closed loop together with the reception coil, and arranged such that a connection node that connects the first and second switches is connected to a second terminal of the capacitor;
    a third switch and a fourth switch sequentially arranged in series so as to form a path arranged in parallel with a path comprising the first and second switches, arranged such that a connection node that connects the third and fourth switches is set to a fixed electric potential; and
    a control unit configured to control the first switch through the fourth switch; and
    an auxiliary coil densely coupled with the reception coil,
    wherein the first and second switches are arranged to form a closed loop together with the auxiliary coil, instead of with the reception coil.

4. A wireless power receiving apparatus configured to receive any one of an electric field, a magnetic field, an electromagnetic field, transmitted from a power receiving apparatus, the wireless power receiving apparatus comprising:
    a reception coil configured to receive the electric power signal;
    a capacitor arranged such that a first terminal thereof is set to a fixed electric potential; and
    an impedance matching circuit comprising at least one switch, and configured to be capable of changing the ON/OFF timing of at least the one switch, and arranged between the capacitor and the reception coil,
    wherein the impedance matching circuit is arranged between the capacitor and an auxiliary coil densely coupled with the reception coil, instead of the reception coil.

5. A wireless power supply system comprising:
    a wireless power supply apparatus configured to transmit an electric power signal including any one of an electric field, a magnetic field, and an electromagnetic field; and a wireless power receiving apparatus configured to receive the electric power signal, transmitted from the wireless power supply apparatus, wherein the power receiving apparatus comprising:
- a reception coil configured to receive the electric power signal;
- a capacitor arranged such that a first terminal thereof is set to a fixed electric potential;
- a first switch and a second switch sequentially connected in series so as to form a closed loop together with the reception coil, and arranged such that a connection node that connects the first and second switches is connected to a second terminal of the capacitor;
- a third switch and a fourth switch sequentially arranged in series so as to form a path arranged in parallel with a path comprising the first and second switches, and arranged such that a connection node that connects the third and fourth switches is set to a fixed electric potential; and
- a control unit configured to control the first switch through the fourth switch,
- wherein the control unit is configured to be capable of switching states between a first state in which the first switch and the fourth switch are on and the second switch and the third switch are off, and a second state in which the first switch and the fourth switch are off and the second switch and the third switch are on, and
- wherein the control unit controls a switching timing at which the state is switched between the first state and the second state such that the amplitude of a current that flows through the reception coil approaches a maximum value.

6. A wireless power supply system comprising:
a wireless power supply apparatus configured to transmit an electric power signal including any one of an electric field, a magnetic field, and an electromagnetic field; and
a wireless power receiving apparatus configured to receive the electric power signal, transmitted from the wireless power supply apparatus,
wherein the power receiving apparatus comprises:
a reception coil configured to receive the electric power signal;
a capacitor arranged such that a first terminal thereof is set to a fixed electric potential;
a first switch and a second switch sequentially connected in series so as to form a closed loop together with the reception coil, and arranged such that a connection node that connects the first and second switches is connected to a second terminal of the capacitor;
a third switch and a fourth switch sequentially arranged in series so as to form a path arranged in parallel with a path comprising the first and second switches, and arranged such that a connection node that connects the third and fourth switches is set to a fixed electric potential; and
a control unit configured to control the first switch through the fourth switch,
wherein the control unit is configured to be capable of switching states between a first state in which the first switch and the fourth switch are on and the second switch and the third switch are off, and a second state in which the first switch and the fourth switch are off and the second switch and the third switch are on, and
wherein the length of the third state is controlled such that the amplitude of a current that flows through the reception coil approaches a maximum value.

7. A wireless power supply system comprising:
a wireless power supply apparatus configured to transmit an electric power signal including any one of an electric field, a magnetic field, and an electromagnetic field; and
a wireless power receiving apparatus configured to receive the electric power signal, transmitted from the wireless power supply apparatus,
wherein the power receiving apparatus comprises:
a reception coil configured to receive the electric power signal;
a capacitor arranged such that a first terminal thereof is set to a fixed electric potential;
a first switch and a second switch sequentially connected in series so as to form a closed loop together with the reception coil, and arranged such that a connection node that connects the first and second switches is connected to a second terminal of the capacitor;
a third switch and a fourth switch sequentially arranged in series so as to form a path arranged in parallel with a path comprising the first and second switches, and arranged such that a connection node that connects the third and fourth switches is set to a fixed electric potential; and
a control unit configured to control the first switch through the fourth switch,
wherein the first and second switches are arranged to form a closed loop together with an auxiliary coil densely coupled with the reception coil, instead of with the reception coil.

8. A wireless power receiving apparatus configured to receive an electric power signal including any one of an electric field, a magnetic field, and an electromagnetic field, transmitted from a wireless power supply apparatus, the power receiving apparatus comprising:
a reception coil configured to receive the electric power signal;
a capacitor arranged such that a first terminal thereof is set to a fixed electric potential;
a first switch and a second switch sequentially connected in series so as to form a closed loop together with the reception coil, and arranged such that a connection node that connects the first and second switches is connected to a second terminal of the capacitor;
a third switch and a fourth switch sequentially arranged in series so as to form a path arranged in parallel with a path comprising the first and second switches, and arranged such that a connection node that connects the third and fourth switches is set to a fixed electric potential; and
a control unit configured to control the first switch through the fourth switch,
wherein the control unit is configured to be capable of switching states between a first state in which the first switch and the fourth switch are on and the second switch and the third switch are off, and a second state in which the first switch and the fourth switch are off and the second switch and the third switch are on, and
wherein the control unit controls the length of the third state dynamically.

* * * * *